United States Patent [19]
Takato et al.

[11] Patent Number: 5,402,485
[45] Date of Patent: Mar. 28, 1995

[54] TWO-WIRE TERMINATION IMPEDANCE GENERATION CIRCUIT OF SUBSCRIBER CIRCUIT

[75] Inventors: Kenji Takato; Kazuhiro Yoshida; Kazuyuki Minohara; Yoshinobu Imai, all of Yokohama; Takeshi Nishioka, Kawasaki, all of Japan

[73] Assignee: Fujitsu Limited, Kanagawa, Japan

[21] Appl. No.: 189,412

[22] Filed: Jan. 31, 1994

[30] Foreign Application Priority Data

Aug. 30, 1993 [JP] Japan .................................. 5-214605

[51] Int. Cl.⁶ ............................................ H04M 1/76
[52] U.S. Cl. .................................... 379/402; 379/399; 379/413; 379/414; 379/416; 379/345
[58] Field of Search ................ 379/399, 401, 398, 394, 379/400, 402, 405, 43, 44, 339, 344, 346, 345, 377, 413, 416, 414, 389

[56] References Cited

U.S. PATENT DOCUMENTS

| | | |
|---|---|---|
| 4,387,273 | 6/1983 | Chea ..................................... 379/398 |
| 4,993,063 | 2/1991 | Kiko ..................................... 379/405 |
| 5,020,101 | 5/1991 | Brotz et al. .......................... 379/389 |

FOREIGN PATENT DOCUMENTS 60-117989  6/1985  Japan .

Primary Examiner—James L. Dwyer
Assistant Examiner—Scott Wolinsky

[57] ABSTRACT

A two-wire termination impedance generation circuit of a subscriber circuit including differential amplifiers, which is provided with a network circuit including capacitors and resistors, an input point, and current sources, the capacitor being comprised of series connected first and second capacitors, the resistor being comprised of series connected first and second resistors and having a high band bypass capacitor connected at the intermediate connecting point of the same, and the resistor being comprised of a complex termination resistor forming an internal termination impedance and a series connected complex termination resistor and complex termination capacitor being connected directly to the telephone line as an external termination impedance, wherein the frequency characteristics can be improved in three ways.

12 Claims, 14 Drawing Sheets

TWO-WIRE TERMINATION IMPEDANCE GENERATION CIRCUIT OF SUBSCRIBER CIRCUIT

BACKGROUND OF THE INVENTION

1. Field of the Invention

The present invention relates to a two-wire termination impedance generation circuit of a subscriber circuit.

In a conventional space division (SD) exchange such as a crossbar switchboard, the exchange switches are formed by a large number of metallic contacts. The battery feed to the subscriber circuits mounted in one-to-one correspondence with the subscribers is performed through choke coils (or windings of relays). In the construction generally adopted, the direct current flowing between the line A and the line B forming the speech path (two-wire telephone line) connecting to the subscribers is cut and the line A and the line B are coupled by a capacitor of about 2 $\mu$F as a value economically realizable and in consideration of the characteristics.

Therefore, as the two-wire termination impedance of a SD exchange, use has been made of a value of for example 600$\Omega$+2 $\mu$F or 900$\Omega$+2 $\mu$F, but the value of 2 $\mu$F has been employed from the viewpoint of practical realizability in the prior art and has no relation at all with the impedance of actual cables.

Current exchanges, however, are changing from the above-mentioned SD exchanges to digital exchanges (electronic exchanges). Accordingly, the exchange switches are also being replaced with a memory (speech path memory) for reading and writing digital speech signals from metallic contacts. Along with this, the internal construction of the subscriber circuits is gradually being replaced with electronic circuits and rapid progress is being made in use of analog LSI's. In the termination method (internal termination) using feedback adopted in LSI technology, a value of 2 $\mu$F is not particularly required any more.

Despite this, even current digital exchanges continue to use 600$\Omega$+2 $\mu$F or 900$\Omega$+2 $\mu$F as the two-wire termination impedance for maintaining existing interface conditions. As the conditions for measuring instruments defining AC characteristics, on the other hand, a termination impedance of 600$\Omega$ or 900$\Omega$ not using 2 $\mu$F is adopted.

In the final analysis, it is required of subscriber circuits that they be provided with a two-wire termination impedance generation circuit for generating by themselves a two-wire termination impedance corresponding to 600$\Omega$+2 $\mu$F as in the past.

2. Description of the Related Art

As will be explained later in more detail with reference to the drawings, the battery feed for the telephone terminal of a subscriber is performed through a choke coil (CH) and the resistors included in the same and through the telephone line (line A and line B). On the other hand, the subscriber circuit is connected to a speech transmission/reception circuit and sends and receives speed transmission signals $T_x$ and speech reception signals $R_x$ through a transformer (TR). For the transformer (TR), use is made of one which ordinarily stops a direct current. To prevent the direct current, a DC-cut capacitor (2 $\mu$F) is connected.

In such a conventional interface, if the secondary side of the transformer (TR) is terminated by 600$\Omega$ or 900$\Omega$, the impedance viewed from the telephone line side becomes 600$\Omega$+2 $\mu$F or 900$\Omega$+2 $\mu$F at the speech band frequency.

However, as mentioned earlier, progress has been made in recent years in the use of electronic circuits for subscriber circuits and the need has arisen for providing circuits in the subscriber circuits for generating the above-mentioned two-wire termination impedance on their own. Various such two-wire termination impedance generation circuits have been proposed, such as in U.S. Pat. No. 4,387,273 (subscriber interface circuit with impedance synthesizer) or Japanese Unexamined Patent Publication (Kokai) No. 60-117989 (subscriber circuit).

Practical two-wire termination impedance generation circuits themselves have been perfected in the above publications etc.

There are many points to be improved in these two-wire termination impedance generation circuits if they are to be truly made practical. In particular, there have been almost no proposals of a two-wire termination impedance generation circuit aimed at the improvement of the frequency characteristic.

The present invention focuses on the following three problems which should be dealt with to improve the frequency characteristics:

(i) First, since a two-wire termination impedance generation circuit is inserted in the subscriber circuit, the frequency characteristics of the speech transmission signal in the conventional subscriber circuit changes from that of a so-called loss circuit at the low band to a gain circuit.

(ii) Second, since a two-wire termination impedance generation circuit is inserted in the subscriber circuit, there is the problem of impairment of the return loss (RL), that is, the AC characteristic showing the quality of the two-wire termination impedance (magnitude of difference from target value). This is due to the fact that the gain versus frequency characteristics of an electronic circuit having the two-wire termination impedance generation circuit as a feedback loop becomes a loss circuit at a high band.

(iii) Third, the amount of feedback through the feedback loop increases much more at high band frequencies and so there is the problem that oscillation etc. are caused and the stability of the circuit is degraded.

This problem (iii) is particularly remarkable in an exchange system utilizing a complex termination impedance. In recent exchange systems, the demand has been for an improvement of the overall speech quality in consideration of the characteristics of telephone cables. In place of a conventional two-wire termination impedance comprised of 600$\Omega$+2 $\mu$F or 900$\Omega$+2 $\mu$F, more and more countries are adopting two-wire complex termination impedances. If such two-wire complex termination impedances are generated by the above-mentioned two-wire termination impedance generation circuit, as mentioned above, there is the tendency for a much greater increase in the amount of feedback at high band frequencies.

SUMMARY OF THE INVENTION

Therefore, the present invention, in consideration of the three problems relating to the frequency characteristics, has as its object the provision of a two-wire termination impedance generation circuit of a subscriber circuit which can improve the frequency characteristics.

To attain the above object, the present invention provides a two-wire termination impedance generation circuit which is added to a subscriber circuit containing a differential amplifier, wherein provision is made of a network circuit including a capacitor and a resistor, an input point, and current sources:

(i) the capacitor being comprised of series connected first and second capacitors,
(ii) the resistor being comprised of series connected first and second resistors and with a high band bypass capacitor connected at the intermediate connecting point of the same, and
(iii) the resistor being comprised of a complex termination resistor forming an internal termination impedance and a series connected complex termination resistor and complex termination capacitor connected directly to the telephone line as an external termination impedance.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the problems therein will be described with reference to the related figures.

Figure 1:
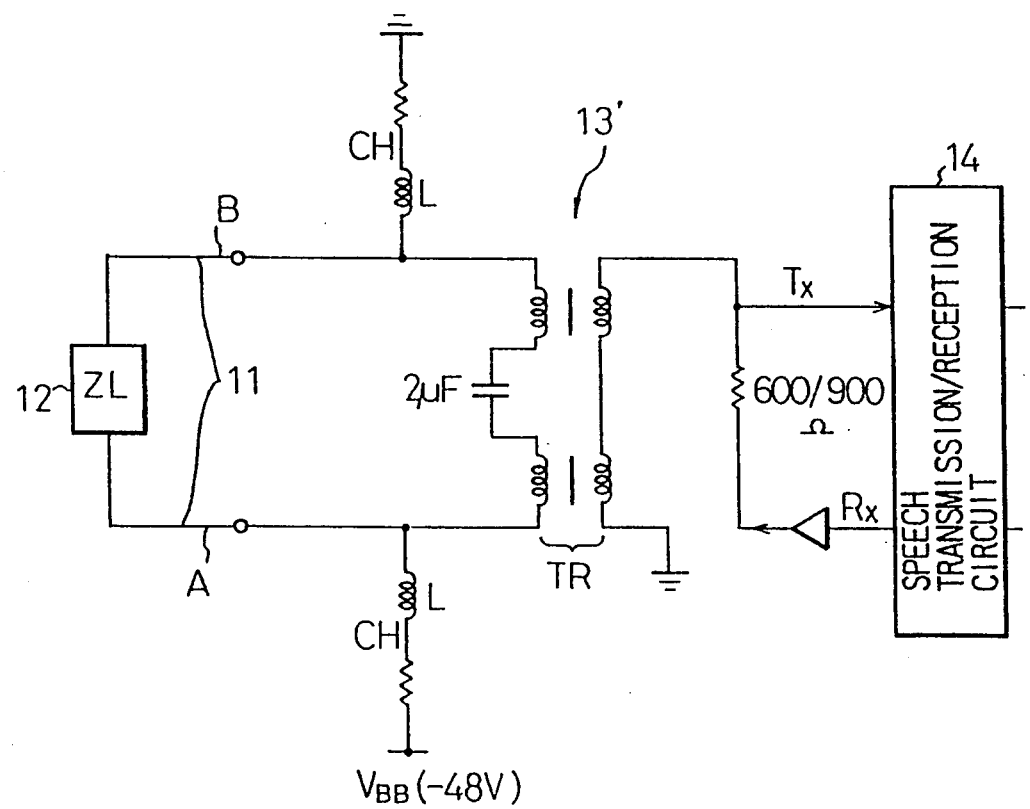
FIG. 1 is a view of the configuration of a conventional telephone exchange system of the related art.

FIG. 1 is a view of the configuration of a conventional telephone exchange system of the related art. In the figure, the portion particularly related to the present invention is that of the subscriber circuit 13'.

The battery feed for the subscriber telephone terminal 12 having an impedance 2L is performed through a choke coil CH of inductance L and the resistances included in the same and through the telephone line (line A and line B) 11. On the other hand, the subscriber circuit 13' is connected to a speech transmission/reception circuit 14 and sends and receives speech transmission signals $T_x$ and speech reception signals $R_x$ through a transformer TR. For the transformer, use is made of one which ordinarily stops a direct current. To prevent the direct current, a DC-cut capacitor (2 $\mu$F) is connected as illustrated.

As mentioned earlier, in such a conventional interface, if the secondary side of the transformer (TR) is terminated by 600$\Omega$ or 900$\Omega$, the impedance viewed from the telephone line 11 side becomes 600$\Omega$+2 $\mu$F or 900$\Omega$+2 $\mu$F at the speech band frequency.

Figure 2:
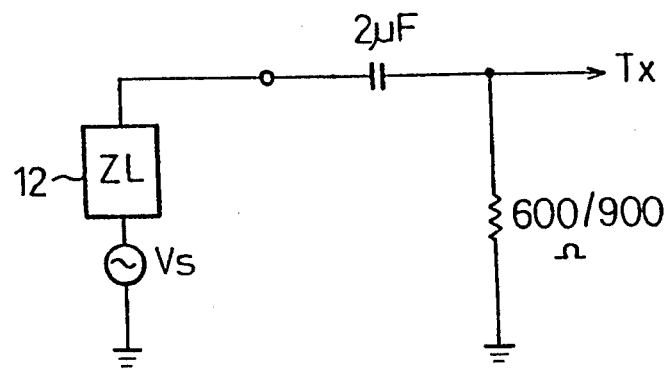
FIG. 2 is a view showing the configuration of FIG. 1 in terms of an equivalent circuit.

FIG. 2 is a view showing the configuration of FIG. 1 in terms of an equivalent circuit. In the figure, $V_s$ shows the speech signal voltage generated at the telephone terminal 12.

However, as mentioned earlier, progress has been made in recent years in the use of electronic circuits for subscriber circuits and the need has arisen for providing circuits in the subscriber circuits for generating the above-mentioned two-wire termination impedance on their own.

Practical two-wire termination impedance generation circuits themselves have been perfected in the publications etc. mentioned above. There are, however, as mentioned above, many points to be improved in these two-wire termination impedance generation circuits if they are to be truly made practical. In particular, there have been almost no proposals of a two-wire termination impedance generation circuit aimed at the improvement of the frequency characteristics.

The present invention focuses on the following three problems which should be dealt with to improve the frequency characteristics. Note that a more detailed explanation of the problems will be given later.

Below, an explanation will be given of a two-wire termination impedance generation circuit of a subscriber circuit based on the present invention which can improve the frequency characteristics in view of the three problems with the frequency characteristics mentioned earlier.

Figure 3:
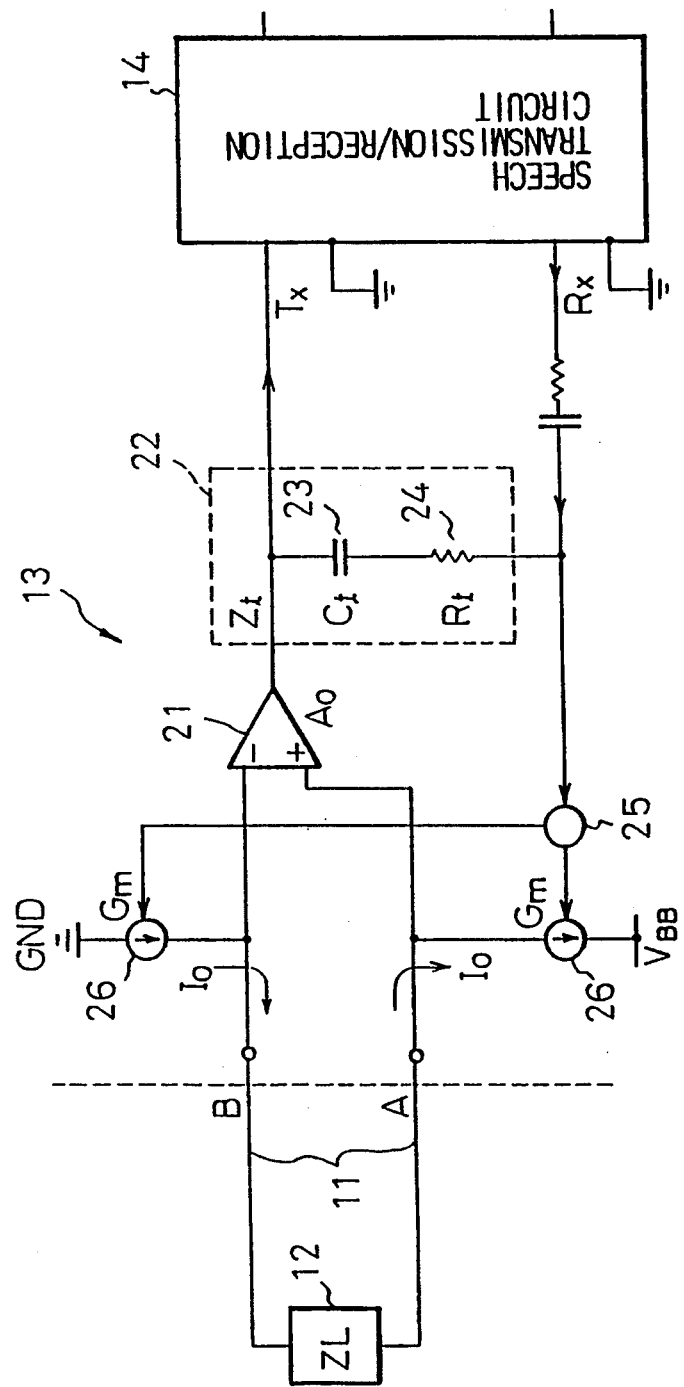
FIG. 3 is a view showing the basic configuration of the present invention.

FIG. 3 is a view showing the basic configuration of the present invention. The circuit shown in this figure is a basic circuit which is able to simultaneously solve the above-mentioned problems or which is able to individually solve the problems. That is, the above-mentioned problems can be solved by just modifying part of the circuit elements shown in the figure. For simplification, however, this is shown by an equivalent circuit for only the speech current (AC current).

First, the circuit forming the main part of the figure is a two-wire termination impedance generation circuit which is connected to one end of a telephone line 11 connected at its other end to a telephone terminal 12. This circuit is applied to a subscriber circuit 13 including a differential amplifier 21 for outputting a speech transmission signal to a four-wire side speech transmission/reception circuit 14, and generates a two-wire termination impedance terminating the one end of the two-wire telephone line 11.

This two-wire termination impedance generation circuit is comprised of a network circuit ($Z_t$) 22 for voltage/current conversion which includes a series connected capacitor ($C_t$) 23 and resistor ($R_t$) 24, and converts to an output current an output voltage from the differential amplifier 21 receiving as input the line voltage (tip and ring line voltage) of the telephone line 11; a low impedance input point 25 for introducing the output current after voltage/current conversion from the network circuit 22; and a pair of current sources ($G_m$) 26 for amplifying the output current introduced to the input point 25 and supplying the result via the telephone line 11 to the telephone terminal 12. Note that the current sources 26 are provided for the line A and the line B, but the two are of the same construction.

Further, in the figure, $C_t$ is the capacitance value of the capacitor, $R_t$ is the resistance value, $Z_t$ is the impedance value, $A_o$ is the amplification factor, and $G_m$ is the conductance (current amplification factor).

In FIG. 1, if the voltage between the line A and the line B is $V_{ab}$, the input impedance of the input point 25 is 0Ω, and the output current flowing to the network circuit 22 is izt, then izt can be expressed by equation (1):

$$izt = V_{ab} \times A_o / Z_t \qquad (1)$$

The above-mentioned current sources 26 correspond to the battery feed circuit mentioned earlier and supply the telephone terminal 12 with a current comprised of the output current izt multiplied by $G_m$ as the battery feed current $I_o$. This $I_o$ flows in the direction shown in FIG. 3 and can be expressed by equation (2):

$$I_o = izt \times G_m = V_{ab} \times A_o \times G_m / Z_t \qquad (2)$$

Here, when assuming that the line voltage $V_{ab}$ between the line A and the line B is provided from the telephone terminal 12, the impedance $Z_{in}$ viewing the subscriber circuit 13 side from the telephone terminal 12 can be expressed by the following equation (3) from the above equation (1) and equation (2):

$$Z_{in} = V_{ab}/I_o = V_{ab}/(V_{ab} \times A_o \times G_m/Z_t) = Z_t/A_o \times G_m \qquad (3)$$

Here, for example, if $A_o \times G_m = 100$ (for example, $A_o = 0.5$ and $G_m = 200$), as the $R_t$ and $C_t$ of FIG. 3 forming the $Z_t$, use may be made of the previously mentioned values of 600Ω (or 900Ω) and 2 μF times 100. That is, use may be made of a resistor 24 with an $R_t$ of 60 kΩ (or 90 kΩ) and a capacitor 23 with a $C_t$ of 0.02 μF. Of these, the economic effect of making the capacitance value of the capacitor 0.02 μF is great due to the contribution of the use of electronic circuits using feedback of the subscriber circuits. Note that the capacitance value (2 μF) of the capacitor becomes 0.02 μF by being multiplied 100 fold since the impedance of the capacitor is expressed as an inverse (i.e., $1/(2\pi f C_t)$).

Therefore, a two-wire termination impedance corresponding to 600Ω (900Ω)+2 μF is generated.

The above-mentioned problems can be solved merely by making some circuit modifications to the basic circuit of the present invention shown in FIG. 3.

(i) The problems mentioned in the above-mentioned (i) are solved by comprising the capacitor 23 in the network circuit 22 by a series connected first capacitor and second capacitor and outputting the speech transmission signal $T_x$ from the intermediate connecting point of the first and second capacitors.

(ii) The problem mentioned in the above-mentioned (ii) is solved by comprising the resistor 24 in the network circuit 22 by a series connected first resistor and second resistor and further by providing a high band bypass capacitor connected between the intermediate connecting point between the first and second resistors and the ground.

(iii) The problem mentioned in (iii) previously is solved by producing the two-wire termination impedance by combining the internal termination impedance formed by the network circuit 22 and the external termination impedance directly connected between the lines of the two-wire telephone line 11.

Figure 4:
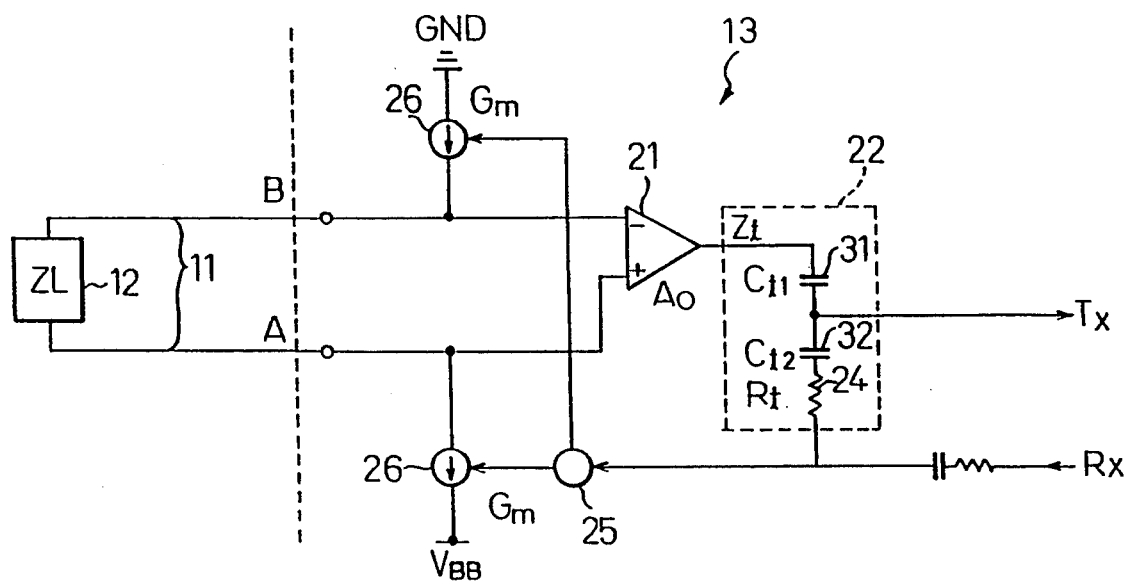
FIG. 4 is a view showing a first embodiment of the present invention.

FIG. 4 is a view showing a first embodiment of the present invention. The two-wire termination impedance generation circuit of this embodiment solves the problem of (i) above. As illustrated, the capacitor (23 in FIG. 3) in the network circuit 22 is comprised of a series connected first capacitor 31 and second capacitor 32. The speech transmission signal $T_x$ is output from the intermediate connecting point of the capacitors 31 and 32.

Figure 5:
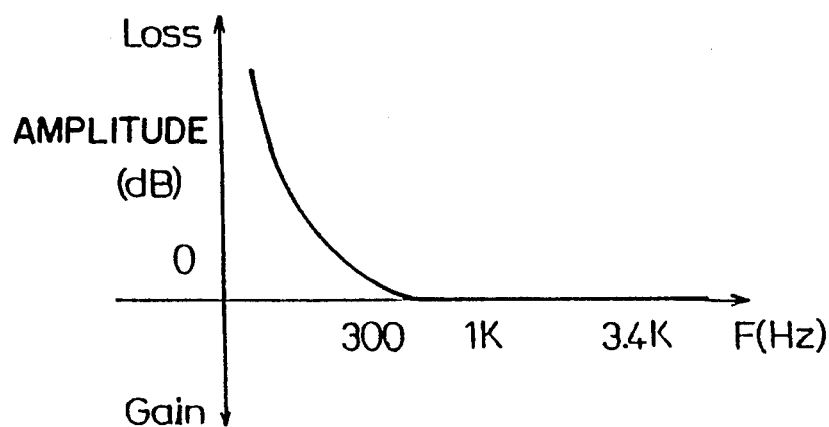
FIG. 5 is a graph showing the amplitude versus frequency characteristics of the SD exchange shown in FIG. 1.

FIG. 5 is a graph showing the amplitude versus frequency characteristics of the SD exchange shown in FIG. 1. The horizontal axis shows the frequency (F) in $H_2$, while the vertical axis shows the amplitude in dB. As shown in this graph, generally the speech transmission signal $T_x$ is subject to loss at frequencies lower than 300 Hz.

Accordingly, it is desired that the amplitude versus frequency characteristics with a digital exchange having electronic subscriber circuits such as shown in FIG. 3 also follow a similar characteristic as in FIG. 5.

Figure 6:
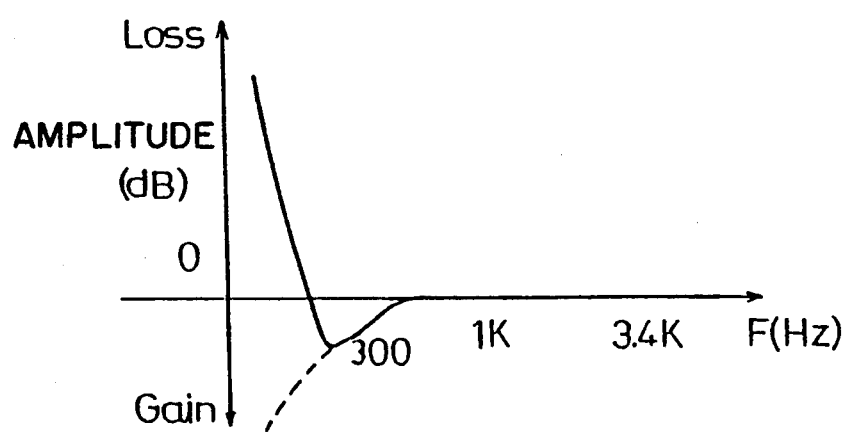
FIG. 6 is a graph showing the amplitude versus frequency characteristics of an exchange having electronic subscriber circuits.

FIG. 6 is a graph showing the amplitude versus frequency characteristics of an exchange having electronic subscriber circuits, composed of the basic circuit of FIG. 3. As shown in this graph, the graph in the case of an exchange having electronic subscriber circuits does not match with the graph of FIG. 5. As shown in FIG. 6, the amplitude of the signal Tx indicates a gain at frequencies lower than 300 Hz as the frequency (F) decreases, and then indicates a loss at lower frequencies, for example, 100 Hz.

The reason for the loss at frequencies lower than 100 Hz is the influence of the battery feed circuit (choke coil in FIG. 1). The inductance of the choke coil is about 2 henries, so the choke coil impedance becomes small at frequencies lower than 100 Hz. The electronic battery feed circuit has almost the same characteristics as the choke coil, so the Tx signal is subject to loss due to the circuit impedance. If the inductance of the choke coil is infinitely high, the amplitude versus frequency characteristics are as shown by a dotted line in FIG. 6, at low frequency. The same characteristic is generally held in an electronic battery feed circuit as well.

The first embodiment shown in FIG. 4 enables easy modification of the low band characteristics, that is, at frequencies lower than 300 Hz, shown in FIG. 6. It is possible to create low band characteristics exactly the same as the graph shown in FIG. 5, of course, and also to make the amplitude vs frequency characteristics flat at frequencies lower than 300 Hz if there is no battery feed circuit. That is, it is possible to set any frequency characteristics in the low band of the speech transmission signal $T_x$ by adjusting the capacitance value $C_{t1}$ of the first capacitor 31 and the capacitance value $C_{t2}$ of the second capacitor 32.

Figure 7:
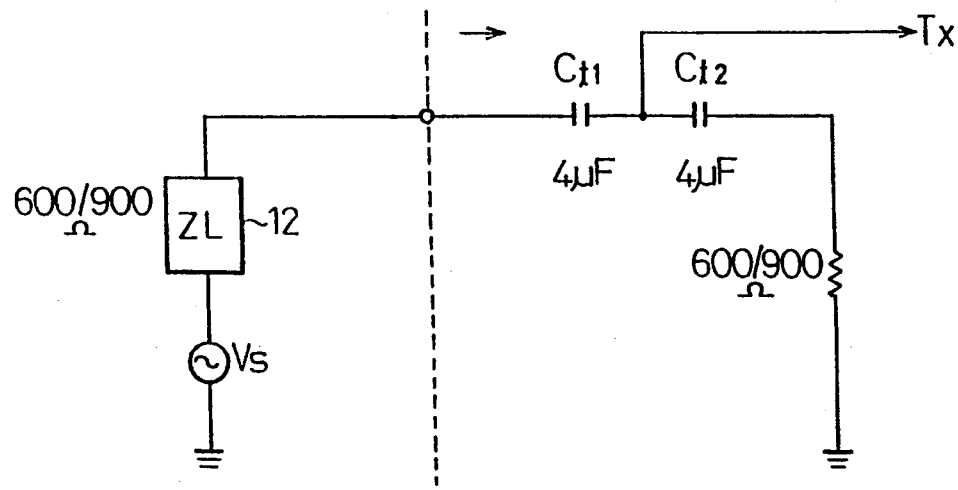
FIG. 7 is an equivalent circuit diagram of the case where $C_{t1}=C_{t2}$ in FIG. 4.

FIG. 7 is an equivalent circuit diagram of the case where $C_{t1}=C_{t2}$ in FIG. 4. By making the capacitance value $C_{t1}$ of the first capacitor 31 and the capacitance value $C_{t2}$ of the second capacitor 32 equal, the impedances of the left side and right side become the same, therefore it is possible to flatten the frequency characteristics of the speech transmission signal Tx at frequencies lower than 300 Hz. That is, a circuit with no frequency characteristics is obtained.

Also if $C_{t1}=C_{t2}=4$ $\mu F$, the serially combined value of $C_{t1}$ and $C_{t2}$ becomes 2 $\mu F$ and it is possible to conform with the previously mentioned 2 $\mu F$.

If desiring to obtain frequency characteristics similar to that of FIG. 5, then it is sufficient to set the values of $C_{t1}$ and $C_{t2}$ so that $C_{t1}<C_{t2}$. If $C_{t2}$ is made larger, the loss of $T_x$ at the low band becomes remarkably larger.

Figure 8:
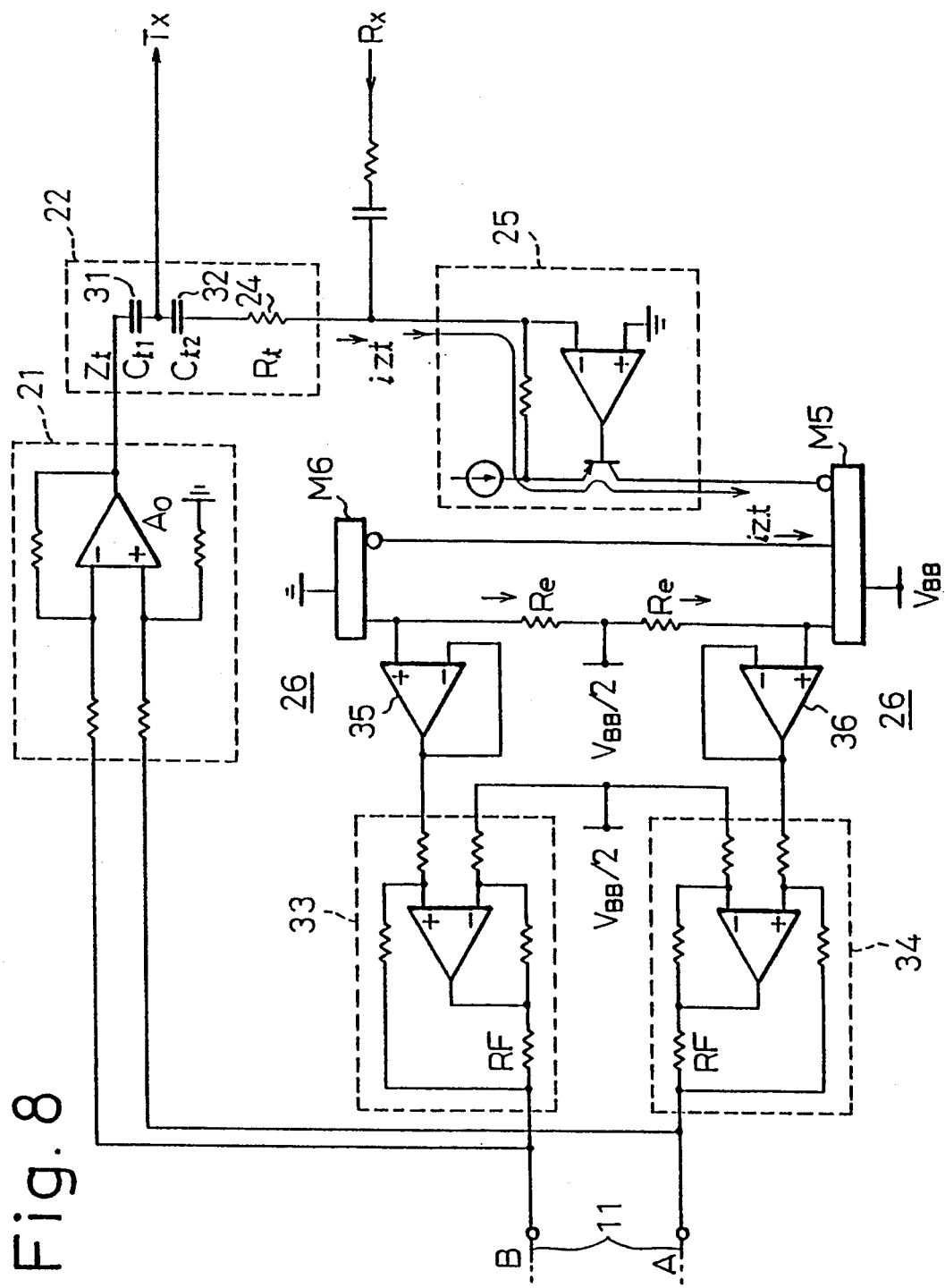
FIG. 8 is a view of a detailed example of realization of the first embodiment.

FIG. 8 is a detailed example of the first embodiment. Constituent elements similar to those already explained are given the same reference numerals or symbols. In the figure, the low impedance input point 25 is shown specifically as a buffer circuit, and the output current izt merely passes through an operational amplifier. The −input terminal of the operational amplifier is the input point 25, while the +input terminal of the operational amplifier is connected to the ground. The operational amplifier operates and an imaginary short state is formed between the −input and the +input terminals, so the input impedance of the input point 25 becomes 0Ω.

A current equivalent to the izt is drawn from the mirror circuit M5 and absorbed by the mirror circuit M6. The ratio of the input and output currents of the mirror circuits M5 and M5 is set to 1, so a voltage drop of $R_e \times izt$ is induced at the illustrated resistors ($R_e$).

The voltage drops are applied through the buffer circuit 35 and 36 to the transconductance amplifiers 33 and 34. A battery feed current $I_0$ proportional to the amount of voltage drop is supplied to the telephone line 11 by the transconductance amplifiers 33 and 34. These mirror circuits, buffer circuits, and transconductance amplifiers form the previously mentioned pair of current sources 26.

Figure 9:
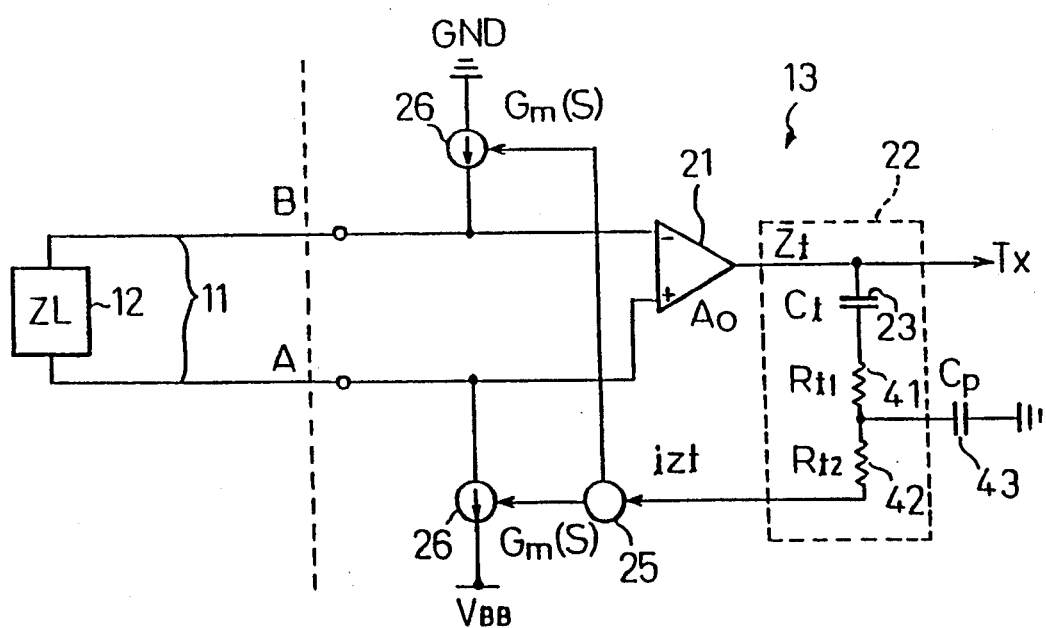
FIG. 9 is a view showing a second embodiment according to the present invention.

FIG. 9 is a view showing a second embodiment according to the present invention. This two-wire termination impedance generation circuit of the second embodiment solves the problem of (ii) mentioned above. As illustrated, the resistance (24 in FIG. 3) in the network circuit 22 is comprised by a series connected first resistor 41 and second resistor 42, and a high band bypass capacitor 43, whose capacitance is small enough to bypass only signals of frequencies above 10 KHz, is provided between the intermediate connecting point of the same and the ground.

Figure 10:
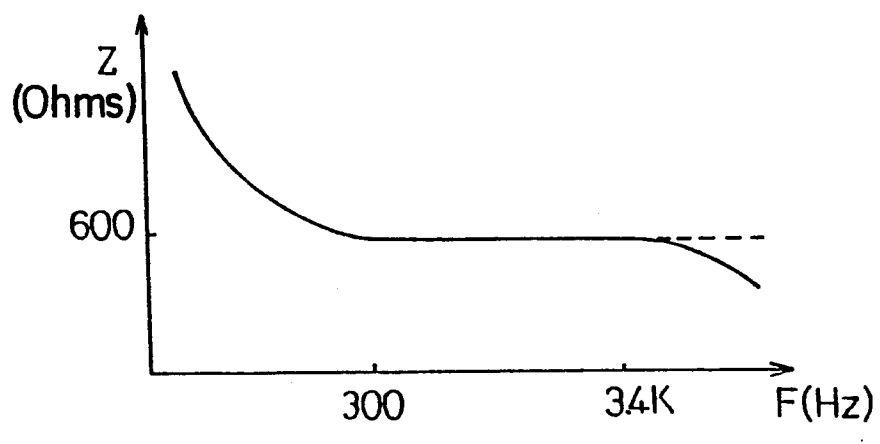
FIG. 10 is a graph showing the impedance characteristics of the feedback circuitry in FIG. 9.

FIG. 10 is a two-wire impedance graph showing the impedance characteristics of the feedback circuitry in FIG. 9. As shown in FIG. 3, the electronic subscriber circuit is comprised of a plurality of amplifiers (operational amplifiers). This is clear from reference to FIG. 8 as well. The mirror circuits (M5 and M6) are also comprised of amplifiers, so a large number of amplifiers are used for constructing the current sources 26 and differential amplifiers 21. Here, assuming the amplifiers are ideal amplifiers (that is, have an infinite open loop gain up to an infinite frequency), the impedance characteristics of FIG. 10 remains flat at frequencies above 3 KHz as shown by the dotted line in the figure. For example, in the case of a two-wire termination impedance of 600Ω+2 $\mu F$, the 2 $\mu F$ component in the high band above 3 KHz is almost negligible, so the two-wire termination impedance becomes a pure resistance of 600Ω. Therefore, a so-called phase lag (phase rotation due to a lag) should not occur in the high band above 3 KHz.

In actuality, however, the amplifier does not become an ideal system. In particular, in a current source ($G_m$) using a large number of amplifiers, the feedback circuitry impedance characteristics at the high band (3.4K or more) deviates from the ideal value as shown in FIG. 10. Therefore, the above-mentioned phase lag occurs at the high band and the return loss deteriorates. Usually, the deviation from the ideal value (600Ω+2 $\mu F$ or 900Ω+2 $\mu F$) of the two-wire termination impedance is defined as the return loss.

Figure 11:
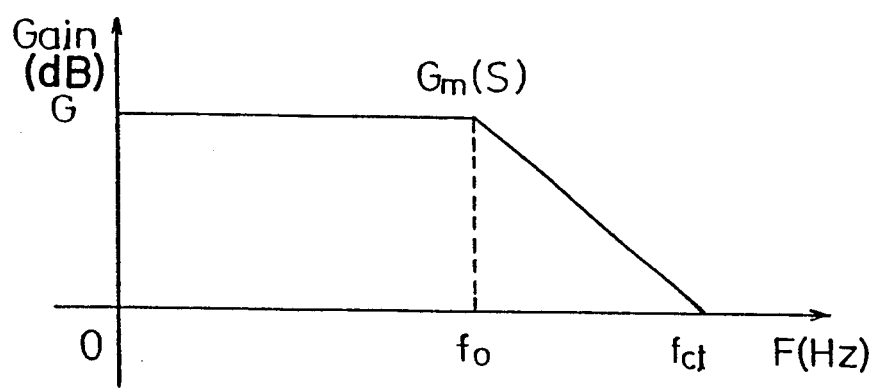
FIG. 11 is a graph showing the gain characteristics of a general electronic circuit.

FIG. 11 is a graph showing the gain characteristics of a general electronic circuit including operational amplifiers. Usually, the above-mentioned phase characteristic (phase rotation of lag) is determined unequivocally once the gain characteristics are determined. In this case, a typical circuit having gain characteristics shown in FIG. 11 is a first order low-pass filter.

Figure 12:
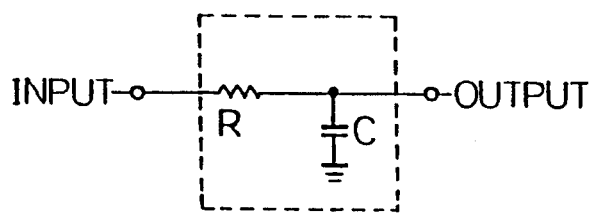
FIG. 12 is an equivalent circuit diagram of a first order low-pass filter.

FIG. 12 is an equivalent circuit diagram of a first order low-pass filter. The transfer function of this low pass filter is represented as the S ($=j\omega$) function. Accordingly, if the conductance of the ideal amplifier (current source 26) is $G_m$, then the conductance of the amplifier having the characteristic of a first order low-pass filter shown in FIG. 12 can be expressed as $G_m(S)$:

$$G_m(S)=G_m/(1+S\times C\times R) \qquad (4)$$

The $C\times R$ in this is a time constant and serves also as a parameter specifying the frequency characteristics. Note that in the above explanation and in the following explanation, for simplification of the explanation, it is assumed that phase rotation of the lag all occurs at the current sources ($G_m$) 26 and that the differential amplifier ($A_0$) 21 is an ideal system (since the number of differential amplifiers 21 required is far smaller than the number of amplifiers of the current source 26).

The two-wire termination impedance in the case of the above $G_m(S)$ becomes as follows based on the above equation (3):

$$Z_{in}(S)=Z_t\times(1+S\times C\times R)/(A_0\times G_m) \qquad (5)$$

Comparing the equation (5) and equation (3), there is a difference of $(1+S\times C\times R)$.

Figure 13:
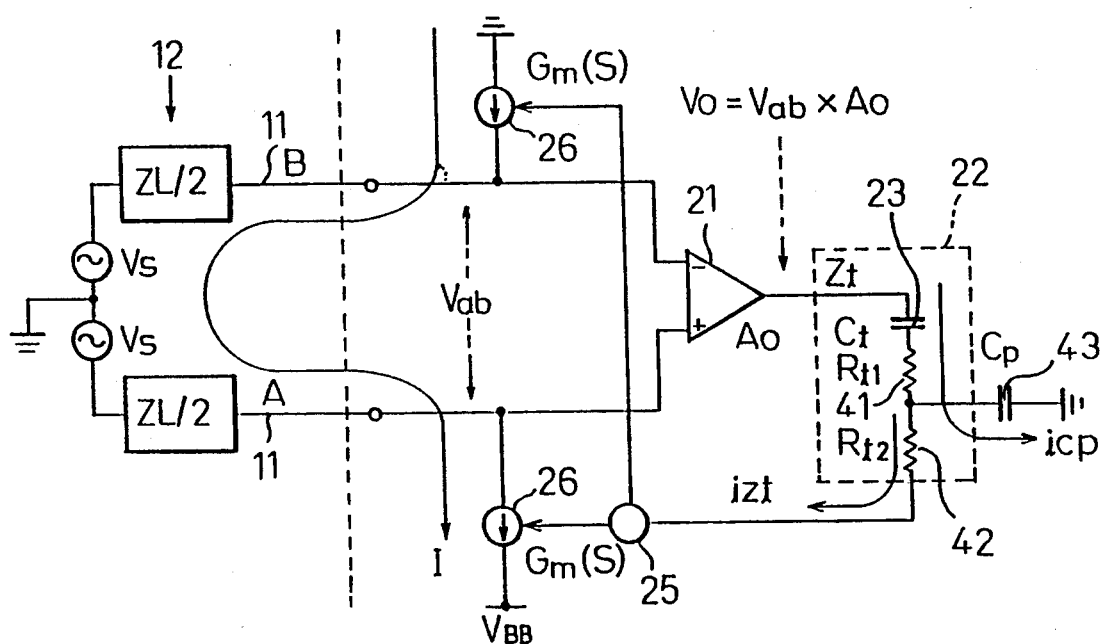
FIG. 13 is a view for explaining the effect of the second embodiment in FIG. 9.

FIG. 13 is a view for explaining the effect of the second embodiment (FIG. 9). Basically, however, the two figures are identical. Referring to this figure, the current icp is bypassed by $R_{t1}$, $R_{t2}$, and $C_p$. The output current izt after the icp is bypassed becomes as shown in equation (6):

$$izt=V_0/Z_t\{1+R_{t2}\times Z_{ct}/(Z_t\times Z_{cp}) \\ +Rt2\times Rt1/(Zt\times Zcp)\} \qquad (6)$$

Where, Zct is the impedance of the capacitor (Ct) 23 and Zcp is the impedance of the capacitor (Cp) 43. In particular, at the high band frequency, $$Z_{ct} << Z_{cp} \quad (7)$$

$$Z_t = R_{t1} + R_{t2} \quad (8)$$

Note that if the potential at the intermediate connecting point of $R_{t1}$ and $R_{t2}$ is $V_m$, then $V_m$ can be expressed by $$V_m = V_0 \times \frac{R_{t2}//Z_{cp}}{Z_{ct} + R_{t1} + (R_{t2}//Z_{cp})}$$

where "//" denotes a parallel connection impedance. Here, izt becomes $$izt = V_0/\{Z_t \times (1 + S \times C_p \times R_{tt})\} \quad (9)$$

where, $R_{tt}$ is $$R_{tt} = R_{t2} \times R_{t1}/(R_{t1} + R_{t2})$$

Accordingly, the two-wire termination impedance $Z_{in}(S)$ can be expressed by the following equation (10):

$$Z_{in}(S) = Z_t \times (1 + S \times C_p \times R_{tt})/(1 + S \times C \times R) \times A_0/G_m \quad (10)$$

Here, considering the phase rotation of the lag at the high band in the actual circuit, by selecting a $C_p$ satisfying the following equation:

$$C_p \times R_{tt} = C \times R \quad (11)$$

$Z_{in}(S)$ becomes equal to $Z_{in}$ and it is possible to make the actual characteristic of the amplifier the same characteristics as an ideal amplifier, so the return loss is remarkably improved.

Accordingly, by making the time constant $C_p \times R_{tt}$, determined by the value $R_{t1}$ of the first resistor 41, the value $R_{t2}$ of the second resistor 42, and the value $C_p$ of the high band bypass capacitor 43 equal to the time constant $C \times R$ of the differential amplifier 21 and the current source 26, it is possible to flatten the frequency characteristics of the return loss up to the high band.

In this case, by setting the time constant $C_p \times R_{tt}$, determined by the value $R_{t1}$ of the first resistor 41, the value $R_{t2}$ of the second resistor 42, and the value $C_p$ of the high band bypass capacitor 43 larger than the time constant $C \times R$ of the differential amplifier 21 and the current source 26, it is possible to further reduce the amount of feedback (izt) at the high band from the network circuit 22 to the current source 26. In general, an increase of the amount of feedback makes oscillation etc. liable to occur, so reduction of the high band feedback is advantageous in terms of the circuit stability at the high band.

By combining the constitution of the second embodiment and the constitution of the first embodiment mentioned above, an even more effective two-wire termination impedance generation circuit can be realized.

Figure 14:
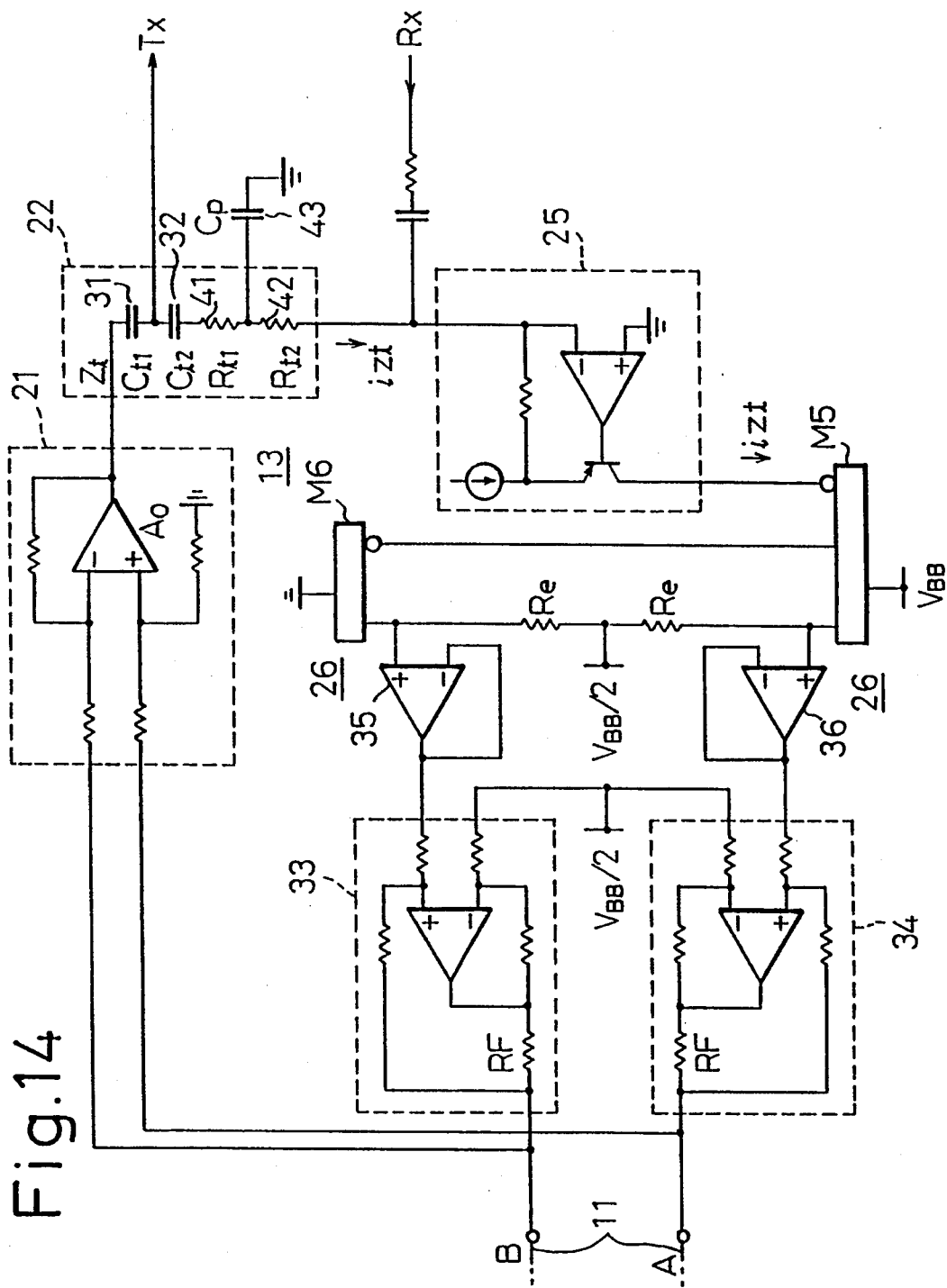
FIG. 14 is a view showing a detailed circuit resulting from the combination of the first embodiment with the second embodiment.

FIG. 14 is a view showing a detailed circuit resulting from the combination of the first embodiment with the second embodiment. Corresponding to the configuration of FIG. 8 already explained, the resistor 24 of FIG. 8 is comprised of the first resistor 41 and second resistor 42 and the high band bypass capacitor 43 is added.

Figure 15:
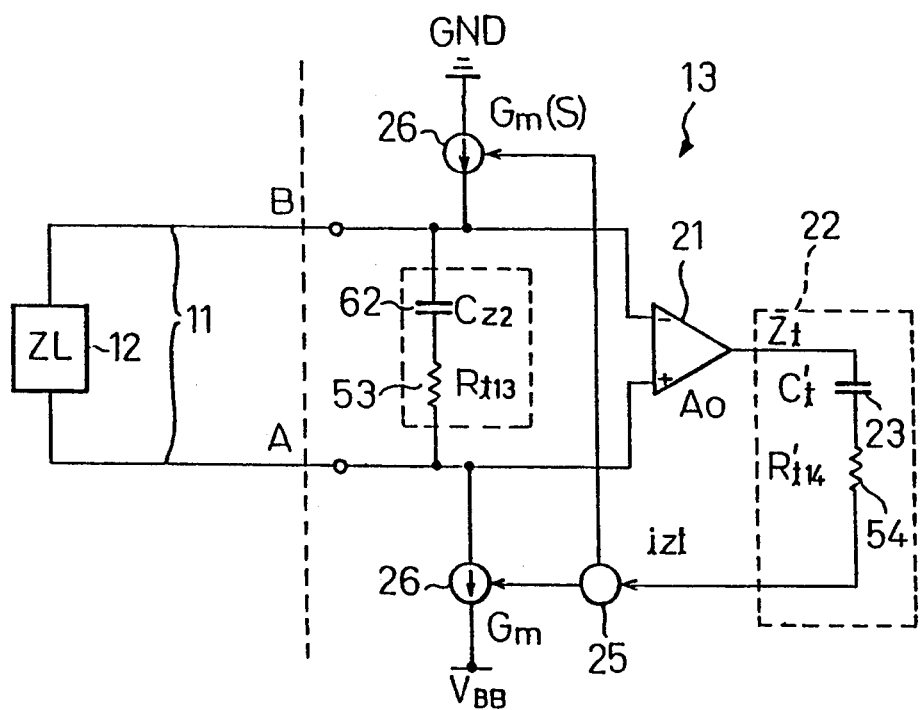
FIG. 15 is a view showing a third embodiment according to the present invention.

FIG. 15 is a view showing a third embodiment according to the present invention. This two-wire termination impedance generation circuit of the third embodiment solves the problems of (iii) mentioned above. As shown, the two-wire termination impedance is generated by the combination of the internal termination impedance formed by the network circuit 22 and the external termination impedance ($C_{z2}$, Rt13) directly connected between the lines of the two-wire telephone line 11. As mentioned earlier, the impedance produced by the network Ct' and Rt14' is set as Ct, Rt14. Ct' and Rt14' are impedances 100 times Ct and Rt14, for example. Here, the impedance provided by Ct and Rt14 is referred to as the internal impedance. The background behind the incorporation of the external termination impedance in addition to the internal termination impedance will be explained below in detail.

The problem of the above-mentioned (iii) is caused, as mentioned earlier, by the fact that a two-wire complex termination impedance is shown from the subscriber circuit 13 side to the telephone line side.

Figure 16:
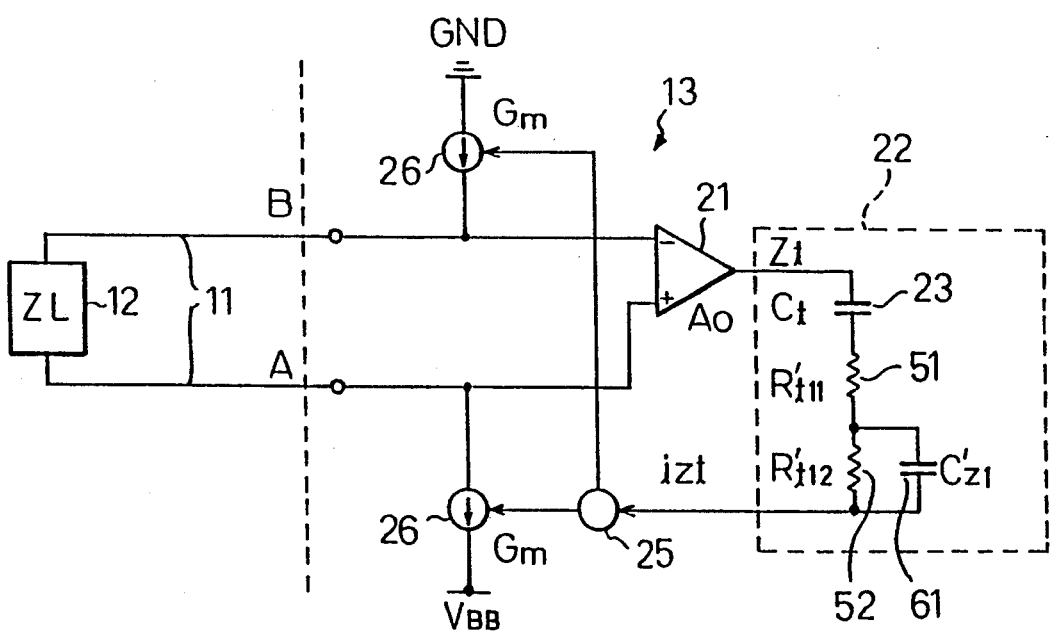
FIG. 16 is a view showing the circuit configuration before reaching the third embodiment.

FIG. 16 is a view showing the circuit configuration before reaching the third embodiment. That is, it shows a construction in which the above-mentioned complex termination impedance is simply inserted in the subscriber circuit of FIG. 3. As shown in the figure, the two-wire complex termination impedance is shown by an equivalent circuit comprised of a series connected first complex termination resistor ($R_{t11}'$) 51 and second complex termination resistor ($R_{t12}'$) 52 and a first complex termination capacitor ($C_{z1}'$) 61 connected in parallel to the second complex termination resistor 52. Note that as general examples of the figures, mention may be made of $R_{t11} = 150\Omega$, $R_{t12} = 820\Omega$, $C_{z1} = 0.07$ μF or $R_{t11}' = 15$ kΩ, $R_{t12}' = 82$ kΩ, and $C_{z1}' = 700$ PF.

With this construction ($C_t$, $R_{t11}'$, $R_{t12}'$, and $C_{z1}'$) of a network impedance, the impedance of the capacitor ($C_{z1}'$) decreases remarkably at the high band frequency. Assuming the case where the high band frequency is 100 kHz, the impedance of $C_{z1}$ largely decreases to several kΩ. This being the case, the network impedance ($R_{t11}'$, $R_{t12}'$, and $C_{z1}'$) appears only as $R_{t11}$ and the complex impedance at a high frequency decreases to 15 kΩ.

This value is ¼ the value compared with the resistance of the network impedance of 60 kΩ and means that the amount of feedback jumps 4-fold. The amount of feedback actually jumps as much as 6-fold compared with the case where the resistance of the network impedance is 90 kΩ. Oscillation etc. tends to occur due to the increase of the amount of feedback and so the circuit operation becomes extremely unstable. This is the problem of the above-mentioned (iii).

This can be easily understood as well from the fact that when the amount of feedback is increased for example four times, the gain margin on a Board diagram is reduced 12 dB.

Figure 17:
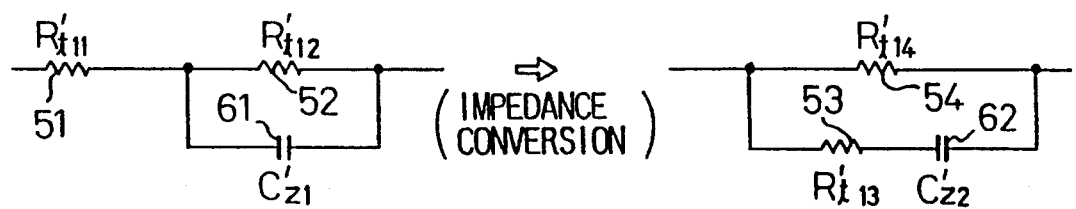
FIG. 17 is a view for explaining the point of focus of the third embodiment.

FIG. 17 is a view for explaining the point of focus of the third embodiment. As shown in the figure, the impedance circuit (in circuit 22 of FIG. 16) of the left column in the figure is converted to the series connected third complex termination resistor ($R_{t13}'$) 53 and second complex termination capacitor ($C_{z2}'$) 62 and the fourth complex termination resistor ($R_{t14}'$) connected in parallel to the series connected resistor 53 and capacitor 62. The external termination impedance is formed by the above-mentioned series connected third complex termination resistor 54 and second complex termination capacitor 62. The fourth complex termination resistor 54 is made a resistor 24 (FIG. 3) forming the internal termination impedance.

The impedance conversion from the left column to the right column of FIG. 17 is performed by the conversion rules shown in the following equations (12), (13), and (14). The derivation of the conversion rules, however, is based on ordinary arithmetic algorithms, so the equations leading up to them are omitted here.

$$R_{t14}' = R_{t11}' + R_{t12}' \quad (12)$$

$$R_{t13}' = (R_{t11}' + R_{t12}') \times R_{t11}'/R_{t12}' \quad (13)$$

$$C_{z2}' = \{(R_{t12}')^2/(R_{t11}' + R_{t12}')^2\} \times C_{z1}' \quad (14)$$

The portion of the $R_{t14}'$ shown in the right column of FIG. 17 corresponds to the portion corresponding to the conventional $R_t$ (internal termination impedance). The portion of $R_{t13}'$ and $C_{z2}'$ is directly connected between the line A and the line B forming the telephone line 11. In this case, for the portion of $R_{t14}'$, like in the past use is made of a 100-fold value, for example, while, on the other hand, for the portion of $R_{t13}'$ and $C_{z2}'$, 1-fold values are used as $R_{t13}$ and $C_{z2}$. That is, $R_{t13}$ 117Ω and $C_{z2} = 0.05$ μF. Further, $R_{t14}'$ is made 97 kΩ to make it a value the same or higher than the above-mentioned 90 kΩ or 60 kΩ and thus the amount of feedback becomes smaller. Accordingly, the $C_{z1}'$ causing the increase of the amount of feedback at the high band frequency is moved outside the feedback loop circuitry, so the problem of stability is solved.

Figure 18:
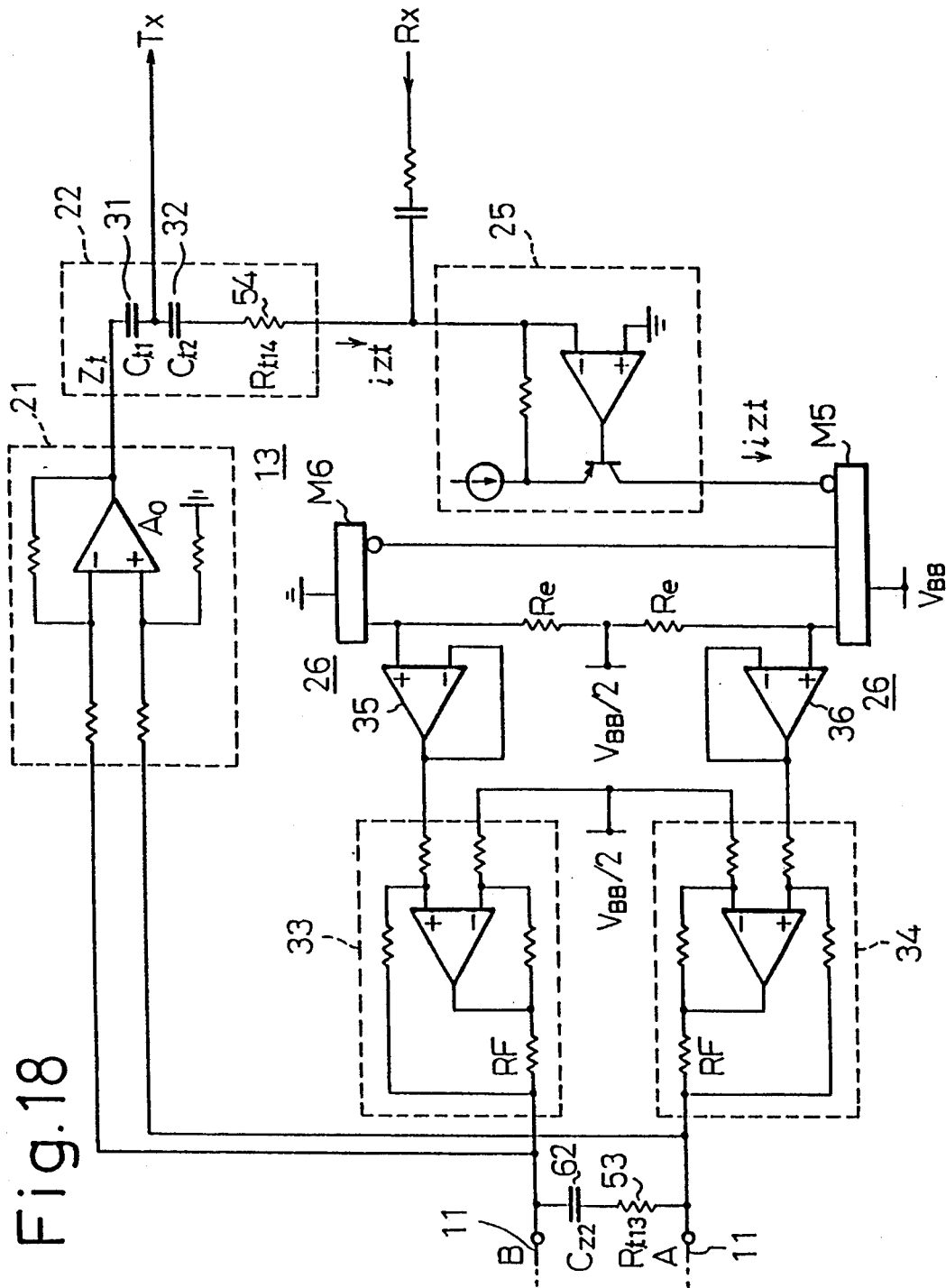
FIG. 18 is a view showing a detailed circuit resulting from the combination of the first embodiment with the third embodiment.

FIG. 18 is a view showing a detailed circuit resulting from the combination of the first embodiment with the third embodiment. This enables the advantage of the first embodiment and the advantage of the third embodiment to be enjoyed. That is, the capacitor 23 in the network circuit 22 is made a series connector first capacitor 31 and second capacitor 32 and a speech transmission signal $T_x$ is output from the intermediate connecting point of the first and second capacitors. The rest of the construction is the same as that of FIG. 14. However, between the lines of the telephone line 11 are connected $C_{z2} + R_{t13}$ as an external termination impedance.

As explained above, according to the present invention, it is possible to solve the problems relating to the frequency characteristics mentioned earlier individually, simultaneously, or in any combination.

We claim:

1. A two-wire termination impedance generation circuit, which is added to a subscriber telephone circuit including differential amplifiers outputting speech transmission signals to a four-wire speech transmission/reception circuit, and which generates a two-wire termination impedance terminating one end of a two-wire telephone line, wherein said two-wire termination impedance generation circuit of said subscriber circuit comprises:
   a network circuit for voltage/current conversion which includes a series connected capacitor and resistor and converts an output voltage from said differential amplifiers, which receives as input a line voltage of said telephone line, into an output current,
   an input point having a low impedance into which said output current flows from said network circuit after voltage/current conversion, and
   a pair of current sources which amplify said output current flowing into said input point and supply said current to said telephone line producing said line voltage, and wherein
   said capacitor in said network circuit is comprised of a series connected first capacitor and second capacitor and said speech transmission signals are outputted from the intermediate connecting point of said first and second capacitors.

2. A two-wire termination impedance generation circuit as set forth in claim 1, wherein the capacitance value of said first capacitor and the capacitance value of said second capacitor are selected to determine the frequency characteristics of said speech transmission signals at the low band.

3. A two-wire termination impedance generation circuit as set forth in claim 2, wherein the serially combined value of the capacitance value of said first capacitor and the capacitance value of said second capacitor is equivalent to the value of the capacitance component of the two-wire termination impedance.

4. A two-wire termination impedance generation circuit as set forth in claim 2, wherein the capacitance value of said first capacitor and the capacitance value of said second capacitor are equivalent, the frequency characteristics of said speech transmission signals being settable at any frequency at the low band.

5. A two-wire termination impedance generation circuit which is added to a subscriber telephone circuit including differential amplifiers outputting speech transmission signals to a four-wire speech transmission/reception circuit, and which generates a two-wire termination impedance terminating one end of a two-wire telephone line, wherein said two-wire termination impedance generation circuit of said subscriber circuit comprises:
   a network circuit for voltage/current conversion which includes a series connected capacitor and resistor and converts an output voltage from said differential amplifiers, which receives as input a line voltage of said telephone line, into an output current,
   an input point having a low impedance into which said output current flows from said network circuit after voltage/current conversion, and
   a pair of current sources which amplify said output current flowing into said input point and supply said current to said telephone line producing said line voltage, and wherein
   said resistor in said network circuit is comprised of a series connected first resistor and second resistor and a high band bypass capacitor is connected between the intermediate connecting point of said first and second resistors and ground.

6. A two-wire termination impedance generation circuit as set forth in claim 5, wherein a time constant determined by a value of said first resistor, a value of said second resistor, and a value of said high band bypass capacitor is equivalent to a time constant of said differential amplifiers and current sources, the frequency characteristic of the two-wire termination impedance being more uniform over a high band of frequencies.

7. A two-wire termination impedance generation circuit as set forth in claim 5, wherein a time constant determined by a value of said first resistor, a value of said second resistor, and a value of said high band bypass capacitor, is larger than a time constant of said differential amplifiers and current sources, an amount of feedback being reduced in a high band of frequencies from said network circuit to said current sources.

8. A two-wire termination impedance generation circuit, which is added to a subscriber telephone circuit including differential amplifiers outputting speech transmission signals to a four-wire speech transmission/reception circuit, and which generates a two-wire termination impedance terminating one end of a two-wire telephone line, wherein said two-wire termination impedance generation circuit of said subscriber circuit comprises:

a network circuit for voltage/current conversion which includes a series connected capacitor and resistor and converts an output voltage from said differential amplifiers, which receives as input a line voltage of said telephone line, into an output current, an input point having a low impedance into which said output current flows from said network circuit after voltage/current conversion, and a pair of current sources which amplify said output current flowing into said input point and supply the same to said telephone line, producing said line voltage, and wherein said two-wire termination impedance is generated by combining an internal termination impedance formed by said series connected capacitor and resistor of said network circuit and an external termination impedance directly connected between the lines of said two-wire telephone line.

9. A two-wire termination impedance generation circuit as set forth in claim 8, wherein when said internal termination impedance of said network circuit is expressed by an equivalent circuit comprised of a series connected first complex termination resistor and second complex termination resistor for realizing a two-wire complex termination impedance and a first complex termination capacitor connected in parallel to said second complex termination resistor, said equivalent circuit is converted to a series connected third complex termination resistor and second complex termination capacitor and a fourth complex termination resistor connected in parallel to said series connected resistor and capacitor, said external termination impedance is formed by said series connected third complex termination resistor and second complex termination capacitor, and said fourth complex termination resistor forming said internal termination impedance.

10. A two-wire termination impedance generation circuit as set forth in claim 8, wherein said capacitor in said network circuit is comprised of a series connected first capacitor and second capacitor and said speech transmission signals are outputted from the intermediate connecting point of said first and second capacitors.

11. A two-wire termination impedance generation circuit as set forth in claim 9, wherein said fourth complex termination resistor is comprised of a series connected first resistor and second resistor and a high band bypass capacitor is connected between an intermediate connecting point of said first and second resistors and ground.

12. A two-wire termination impedance generation circuit, which is added to a subscriber telephone circuit including differential amplifiers outputting speech transmission signals to a four-wire speech transmission/reception circuit, and which generates a two-wire termination impedance terminating one end of a two-wire telephone line, wherein said two-wire termination impedance generation circuit of said subscriber circuit comprises:

a network circuit for voltage/current conversion which includes a series connected capacitor and resistor and converts an output voltage from said differential amplifiers, which receives as input a line voltage of said telephone line, into an output current, an input point having a low impedance into which said output current flows from said network circuit after voltage/current conversion, and a pair of current sources which amplify said output current flowing into said input point and supply said current to said telephone line producing said line voltage and wherein said capacitor in said network circuit is comprised of a series connected first capacitor and second capacitor and said speech transmission signals are outputted from the intermediate connecting point of said first and second capacitors and said resistor in said network circuit is comprised of a series connected first resistor and second resistor and a high band bypass capacitor is connected between an intermediate connecting point of said first and second resistors and ground.

* * * * *